July 16, 1957  W. L. MITCHELL  2,799,077
TOOL GUIDING AND POSITIONING EDGE TRIM CUT-OFF GAUGE
Filed June 15, 1953
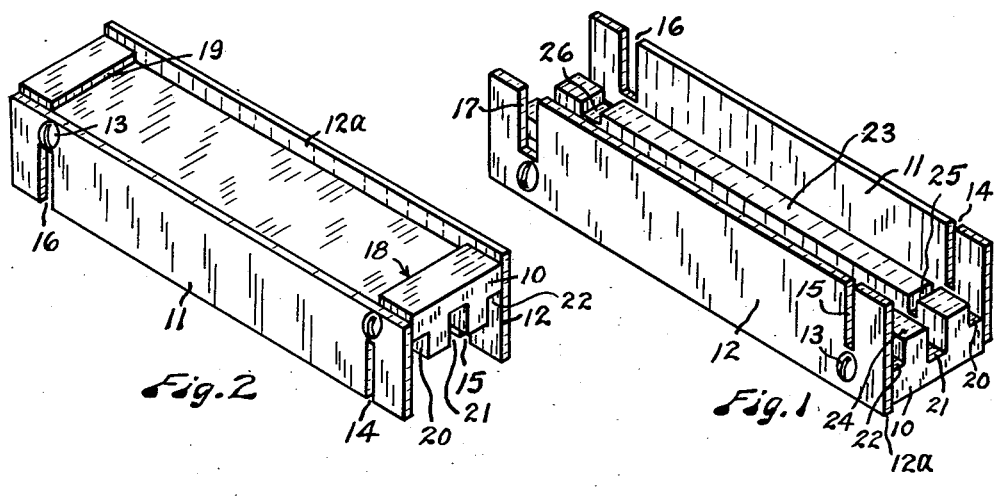
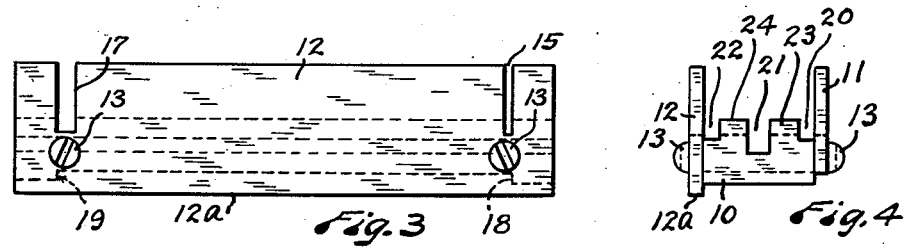
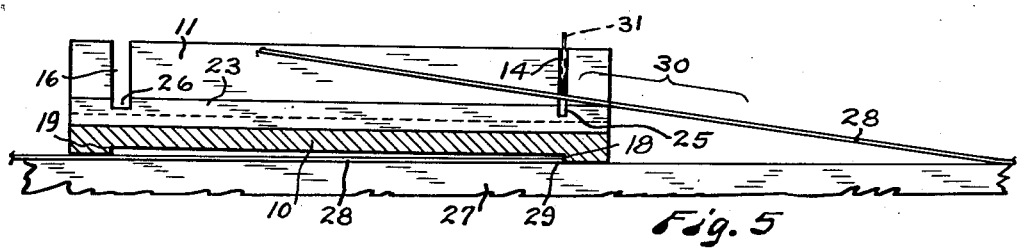
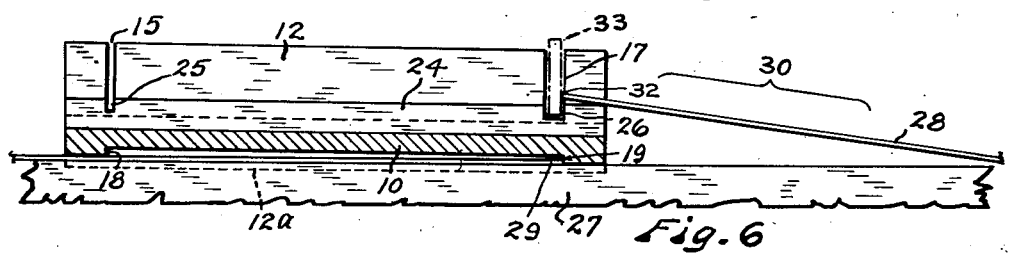
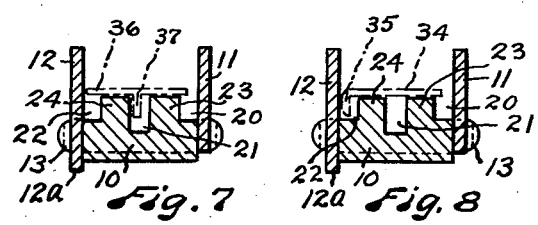
INVENTOR.
William L. Mitchell
BY
ATTORNEY United States Patent Office 2,799,077
Patented July 16, 1957

2,799,077

TOOL GUIDING AND POSITIONING EDGE TRIM CUT-OFF GAUGE

William L. Mitchell, Seattle, Wash.

Application June 15, 1953, Serial No. 361,501

5 Claims. (Cl. 29—67)

My invention relates to a tool guiding and positioning edge trim cut-off gauge.

In installing edge trim on table tops and like articles where the edge trim is applied progressively around the article, it is necessary, in finishing the work, to cut the last applied end portion of the trim at exactly the right location so that it will abut the first applied end of the trim and form a neat and close fitting butt joint without buckling and without leaving an objectionable crack or gap.

An object of my invention is to provide a simple and efficient tool guiding and positioning edge trim cut-off gauge which may be applied to a work piece, such as a table top on which edge trim is being installed, with shoulder parts of the gauge in engagement with a previously attached end of the edge trim and which will receive and support an overhanging end portion of the edge trim and will guide and position a cut-off tool, such as a saw, in squarely cutting off the overhanging portion of the edge trim at exactly the correct location to match the previously attached end and form a closely fitting and neat butt joint, the longitudinal dimension of the tool providing a gauge means for squaring the kerfs with the edge trim and a mounting means for a pair of kerfs for a tool, as a file, the plane of the axis of which kerfs is parallel with the plane of the axis of the first named pair of kerfs, i. e., the saw kerfs.

Another object of the invention is to provide a cut-off gauge of substantially channel shape cross section having at least one pair of transversely aligned tool receiving kerfs in its side walls and having on its bottom side at least one shoulder positioned in the same plane or in alignment with aligned tool guiding walls of a pair of transversely aligned tool receiving kerfs and adapted to engage with an end of edge trim which is attached to a work piece while an overlapping portion of the edge trim to be attached is being cut off by a tool operating in the kerfs.

Another object is to provide a cut-off gauge of approximately channel shape in cross section having work piece engaging guide means along one edge thereof overhanging the plane of the bottom of said gauge.

Another object is to provide a tool guiding and positioning edge trim cut-off gauge of approximately channel shape in cross section having within the gauge and in the bottom wall thereof one or more longitudinally extending edge trim flange receiving grooves.

The above mentioned general objects of my invention, together with others, inherent in the same, are attained by the mechanism illustrated in the following drawings, the same being preferred exemplary forms of embodiment of my invention, throughout which drawings like reference numerals indicate like parts.

Figure 1 is a perspective view of a tool guiding and positioning edge trim cut-off gauge constructed in accordance with my invention showing the same in a right side up position.

Fig. 2 is a perspective view of said gauge inverted.

Fig. 3 is a side elevation of said gauge.

Fig. 4 is an end view of said gauge.

Fig. 5 is a longitudinal sectional view of the gauge showing the same applied to an object or work piece on which edge trim is being installed, fragments of the work piece and edge trim being shown in elevation.

Fig. 6 is a view similar to Fig. 5 but showing the gauge turned end for end as it will be when a file is being used in wider kerf to smooth the end of a piece of edge trim which has been cut by a saw in the manner illustrated in Fig. 5.

Fig. 7 is a view in cross section of the gauge showing by dot and dash lines a piece of T shaped edge trim in said gauge.

Fig. 8 is a cross sectional view similar to Fig. 7 showing in the gauge a piece of edge trim which has an edge flange or lip.

This cut-off gauge is particularly well adapted for matching butt joints of metal edge trim used to edge table tops made of plywood bonded decorative plastic laminate but it will be understood that it may be used in connection with substantially any edge trim which is being applied to a plane flat work piece and in which it is necessary to provide a butt joint between a previously attached end portion and an overlapping end portion of the edge trim. Also this gauge may be advantageously used in squaring the end of a piece of edge trim which has not yet been attached to a work piece.

The embodiment of this tool guiding edge trim cut-off gauge herein disclosed comprises a bottom piece 10 and two side members 11 and 12 which may be different width, rigid with the bottom piece 10. These parts constitute the gauge frame. Preferably the bottom piece 10 is formed of light weight soft metal, such as aluminum to minimize the weight of the gauge and to avoid damage to saw teeth which may come in contact therewith. Preferably the side members 11 and 12 are formed of steel and are rigidly secured to the bottom piece 10 by screws 13. The gauge frame formed by the parts 10, 11 and 12 is of substantially channel shape in cross section and of a length which functions as a gauge means in squaring the kerfs with the trim edge as will appear.

The side members 11 and 12 have transversely aligned narrow saw receiving slots or kerfs, 14 and 15 respectively, positioned adjacent one end thereof and extending from the top edges of the side members downwardly. Also preferably these side members 11 and 12 have wider transversely aligned file receiving slots or kerfs, 16 and 17 respectively, positioned adjacent the other ends of said side members remote from kerfs 14 and 15, and hence in space relation thereto, and extending from their top edges downwardly, the planes through the axis of each set of kerfs being substantially parallel.

One of the side members, such as the side member 12, is preferably wider than the other side member and has a portion 12a which overhangs the bottom member 10 and forms a work piece engaging guide flange, as hereinafter described.

Preferably the steel side members 11 and 12 are case hardened to insure against wear and distortion of the walls of the kerfs 14, 15, 16 and 17 by tools which are used therein, as hereinafter described, and which wear might result in inaccurate work.

The bottom piece 10 has its outer side or face cut away or relieved intermediate its two ends to provide two edge trim end engaging shoulders or faces 18 and 19. The shoulder 18 is positioned in alignment with and in the common plane of the walls of the saw receiving kerfs 15 which are nearest the adjacent end of the gauge frame. The shoulder 19 is positioned in alignment with and in the common plane of the walls of the file receiving kerfs 16 and 17 which are nearest to the end of the gauge frame adjacent these kerfs.

The upper side of the bottom 10 is provided with preferably a configuration registering with the parts of an edge trim. This may be three longitudinally extending edge trim flange receiving grooves 20, 21 and 22. The grooves 20 and 22 are rabbet grooves positioned adjacent to the respective side plates 11 and 12. The groove 21 is positioned medially of the bottom piece 10. Two ribs or lands 23 and 24 are provided respectively between the medial groove 21 and the side grooves 20 and 22. Transverse tool clearance grooves 25 and 26 are herein shown in the ribs or lands 23 and 24 in alignment with the respective kerfs 14 and 15, and 16 and 17. As the bottom part 10 is of soft metal these transverse grooves will be made by the tools in the use of the gauge, if said grooves are not initially provided.

Instances in the use of this tool guiding and positioning cut-off gauge are illustrated in Figs. 5 and 6, in which 27 is a work piece, such as a table top, on which edge trim 28 is being installed. In connection with Figs. 5 and 6 it will be assumed that edge trim 28, as shown at the left in these figures and which has a straight smooth end 29 squared at right angles to the length of the strip, has been progressively secured around the edge of the table top or work piece 27 to a point where it is necessary to cut off an overlapping end portion 30 of said edge trim to complete the work and form a smooth closely fitting butt joint with the first applied end 29.

This overlapping end portion 30 is cut off at the correct location and accurately squared by placing the bottom 10 of the gauge frame against the edge of the work piece 27 over the first applied edge trim, with the gauge shoulder 18 resting against the end 29 of the edge trim and the side flange 12a resting against the table or work piece 27. The gauge frame is held firmly in place with one hand and the overlapping end portion 30 of edge trim 28 is held firmly between the two sides of the gauge frame and in contact with the ribs or lands 23 and 24. While the parts are thus held a saw 31, indicated by dot and dash lines Fig. 5, is reciprocably used to squarely cut off the edge trim at exactly the correct location while said saw is accurately positioned and guided in the saw receiving kerfs 14 and 15. After the overlapping end portion 30 of the edge trim has been cut off to an accurate dimension, as just described, the tip 32 of this overlapping end portion may be smoothed and burrs removed from the same by reversing the gauge end for end so that the shoulder 19 rests against the end 29 of the edge trim as shown in Fig. 6, and reciprocably using thereon a file 33, shown by dot and dash lines in said Fig. 6, while the file is positioned by and guided in the wider file receiving kerfs 16 and 17, the common axis of each of which are in a plane substantially parallel to the plane of the common axis of kerfs 14 and 15.

The side flange 12a helps to correctly align the gauge frame longitudinally of the work and also helps to support the gauge frame on the work while the tools are being used on the edge trim. Obviously the flange 12a does not need to be continuous from end to end of the gauge frame as long as it is capable of overhanging the edge of a work piece and accurately aligning the gauge frame lengthwise of the edge trim. Ordinarily an edge of the trim which is being cut will lie against the same face of the side wall 12 which forms the work engaging part of the guide flange 12a, see Figs. 7 and 8, and this helps in insuring accurate alignment of the part of the edge trim which is being cut. Without said side flange 12a the longitudinal dimension functions as a gauging means for squaring the kerfs and the edge trim. The longitudinal dimension also provides for mounting the other pair of kerfs, as 16 and 17, in spaced relation to the pair of kerfs, as 14 and 15, the common plane of the kerfs of one pair being substantially parallel to the corresponding plane of the kerfs of the other pair, said longitudinal dimension functioning as a gauge common to both pairs of kerfs.

If edge trim 36 of T shape in cross section, as shown by dot and dash lines, in Fig. 7, is being used, then the flange 37 of this edge trim is accommodated in the medial groove 21. If edge trim 34 which has a marginal lip or flange 35, as shown by dot and dash lines in Fig. 8, is being used, then the lip or flange 35 is accommodated in one of the longitudinal grooves 20 or 22. The grooves 21, 21 and 22 thus provide clearance for flanges on the edge trim and allow the flat part of the edge trim to rest on the lands or ribs 23 and 24.

The loose end portion of the edge trim 28, while in the gauge frame, is inclined slightly away from the adjacent edge of the work 27, see Figs. 5 and 6. This results in the cut-off end of the edge trim being beveled slightly and this is beneficial to the work because flanges, such as 35 and 37, Figs. 7 and 8, when so beveled, will be sure to clear the end of the trim which is attached to the work—leaving no projecting heel. Also, the exterior face of an end so beveled will make a closer joint with the other end of the edge trim.

Obviously, changes may be made in the forms, dimensions and arrangement of parts of my invention without departing from the principle thereof, the above setting forth only preferred forms of embodiment.

I claim:

1. A tool guiding and positioning edge trim cut-off gauge, comprising a thin-walled gauge frame of approximately channel shape cross section in receiving edge trim between the two sides thereof; a stop shoulder positioned on the bottom of said gauge frame in engaging a squared end of edge trim which is attached to a work piece; and transversely aligned tool receiving kerfs one in each of the side walls of said gauge frame substantially perpendicular to and extending toward the thin bottom wall of said gauge frame and with the face of the kerf nearest the adjacent end of the gauge frame lying in the same plane as said stop shoulder, whereby overlapping edge trim cut by a tool operating in said kerfs will accurately butt join the edge trim end against which said shoulder is positioned.

2. A tool guiding and positioning edge trim cut-off gauge, comprising a thin-walled gauge frame of approximately channel shape cross section; a stop shoulder on the bottom of said gauge frame; two transversely aligned tool receiving kerfs one in each of the side walls of said gauge frame substantially perpendicular to the thin bottom wall of said gauge frame and with the face of the kerf nearest the adjacent end of the gauge lying in the same plane and closely adjacent to said stop shoulder; and a longitudinally extending edge trim flange receiving groove in the upper side of the bottom wall of said gauge frame.

3. A tool guiding and positioning edge trim cut-off gauge, comprising a thin-walled gauge frame of approximately channel shape cross section; a stop shoulder on the bottom of said gauge frame; two transversely aligned tool receiving kerfs one in each of the side walls of said gauge frame substantially perpendicular to the thin bottom wall of said gauge frame and with the face of the kerf nearest the adjacent end of the gauge frame lying in the same plane as said stop shoulder; and longitudinally extending grooves in the upper side of the bottom wall of said gauge frame registrable with parts of the edge trim.

4. A tool guiding and positioning edge trim cut-off gauge, comprising a thin-walled gauge frame of approximately channel shape cross section; an edge trim engaging stop shoulder on the bottom of said gauge frame; gauge frame aligning flange means extending below the bottom of said gauge frame along one side thereof; and transversely aligned tool receiving kerfs one in each of the side walls of said gauge frame substantially perpendicular to the thin bottom wall of the gauge frame and with the face of the kerf nearest the adjacent end of the gauge frame lying in the same plane as said stop shoulder, said stop shoulder and the bottom of said kerfs being spaced apart only about the thickness dimension of said thin bottom wall.

5. A tool guiding and positioning edge trim cut-off gauge, comprising a thin-walled gauge frame of approximately channel shape cross-sectionally considered in receiving edge trim between the two side walls thereof, the edge of the end portion being normal to the axis of the frame and one side wall extending below the bottom of said gauge frame in providing an aligning flange for said gauge; an edge trim engaging stop shoulder on the thin bottom wall of said gauge frame adjacent an end portion thereof in engaging a squared end of edge trim which is attached to a work piece; and two transversely aligned tool receiving kerfs, one in each of the side walls of said gauge frame substantially perpendicular to the thin bottom wall of the gauge frame, normal to the axis of the frame and with the face of the kerf nearest the adjacent end of the gauge frame lying in coplanar relation with said shoulder, the bottom of said kerfs and said edge trim stop shoulder being separated only about the thickness dimension of said thin bottom wall.

References Cited in the file of this patent

UNITED STATES PATENTS

| | | |
|---|---|---|
| 1,109,952 | Armstrong | Sept. 8, 1914 |
| 2,024,111 | Phillis | Dec. 10, 1935 |
| 2,518,801 | Ludwig | Aug. 15, 1950 |
| 2,598,117 | Ethridge | May 27, 1952 |
| 2,608,255 | Mitchell | Aug. 26, 1952 |
| 2,619,173 | Crain | Nov. 25, 1952 |